United States Patent
Lasser

(10) Patent No.: US 9,390,008 B2
(45) Date of Patent: Jul. 12, 2016

(54) DATA ENCODING FOR NON-VOLATILE MEMORY

(71) Applicant: SANDISK TECHNOLOGIES INC., Plano, TX (US)

(72) Inventor: Menahem Lasser, Kohav-Yair (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 162 days.

(21) Appl. No.: 14/103,656

(22) Filed: Dec. 11, 2013

(65) Prior Publication Data

US 2015/0161044 A1    Jun. 11, 2015

(51) Int. Cl.
*G06F 12/06* (2006.01)
*G06F 3/06* (2006.01)

(52) U.S. Cl.
CPC .......... *G06F 12/0607* (2013.01); *G06F 3/0611* (2013.01); *G06F 3/0638* (2013.01); *G06F 3/0683* (2013.01); *G06F 2212/1024* (2013.01); *G06F 2212/206* (2013.01); *G06F 2212/261* (2013.01)

(58) Field of Classification Search
CPC .......... G06F 12/0864; G06F 12/0246; G06F 2212/7201; G06F 12/0238; G06F 12/0607; G06F 2212/1024; G06F 2212/206; G06F 2212/261; G06F 3/0611; G06F 3/0638; G06F 3/0683
USPC .......... 711/E12.018, 128, 103, 206, E12.001, 711/E12.008, E12.078, 154, 156, 127, 133, 711/5, 157
See application file for complete search history.

(56) References Cited

U.S. PATENT DOCUMENTS

| | | | |
|---|---|---|---|
| 5,787,487 A | 7/1998 | Hashimoto et al. | |
| 5,893,097 A | 4/1999 | Hayata et al. | |
| 6,728,825 B1 | 4/2004 | Norman | |
| 6,862,235 B2 | 3/2005 | Sakata et al. | |
| 6,957,307 B2 | 10/2005 | Rieseman et al. | |
| 7,477,072 B1 | 1/2009 | Kao et al. | |
| 8,406,053 B1 | 3/2013 | Dutta et al. | |
| 8,422,668 B1 | 4/2013 | Thichina | |
| 8,571,790 B2 | 10/2013 | Tanabe et al. | |
| 8,644,067 B2 | 2/2014 | Jeon | |
| 8,838,881 B2 | 9/2014 | Patapoutian et al. | |

(Continued)

FOREIGN PATENT DOCUMENTS

| KR | 20120074818 A | 6/2012 |
|---|---|---|
| WO | 2010092536 A1 | 8/2010 |

OTHER PUBLICATIONS

Notice of Allowance and Fee(s) Due mailed May 5, 2015 in U.S. Appl. No. 13/921,566, 14 pages.

(Continued)

*Primary Examiner* — Mark Giardino, Jr.
*Assistant Examiner* — Edward Waddy, Jr.
(74) *Attorney, Agent, or Firm* — Toler Law Group, PC

(57) ABSTRACT

A data storage device includes a memory device and a controller. Mapping circuitry is configured, in response to receiving data, to apply a one-to-many mapping to each group of multiple groups of bits in the received data to generate mapped data that includes multiple groups of mapped bits. Storage elements of the memory device are partitioned into multiple skip groups and the mapped bits of each group of mapped bits are interleaved across the skip groups such that different bits of a group of mapped bits are written into different skip groups.

23 Claims, 8 Drawing Sheets

(56) References Cited

U.S. PATENT DOCUMENTS

| | | |
|---|---|---|
| 8,966,205 B1 | 2/2015 | Lo et al. |
| 9,015,405 B2 | 4/2015 | Ordentlich et al. |
| 2002/0194438 A1 | 12/2002 | Lasser |
| 2003/0208505 A1 | 11/2003 | Mullins et al. |
| 2004/0042292 A1 | 3/2004 | Sakata et al. |
| 2004/0080979 A1 | 4/2004 | Park |
| 2004/0205306 A1 | 10/2004 | Janas et al. |
| 2005/0144368 A1 | 6/2005 | Chung et al. |
| 2005/0213393 A1 | 9/2005 | Lasser |
| 2007/0038971 A1* | 2/2007 | Hiramatsu .......... G06F 15/7867 326/38 |
| 2008/0140692 A1 | 6/2008 | Gehring et al. |
| 2008/0158948 A1 | 7/2008 | Sharon et al. |
| 2008/0189490 A1 | 8/2008 | Cheon et al. |
| 2008/0228995 A1 | 9/2008 | Tan et al. |
| 2009/0106282 A1 | 4/2009 | Silverman |
| 2009/0109788 A1 | 4/2009 | Moon et al. |
| 2009/0132758 A1 | 5/2009 | Jiang et al. |
| 2009/0193184 A1 | 7/2009 | Yu et al. |
| 2009/0213653 A1 | 8/2009 | Perlmutter et al. |
| 2009/0268532 A1 | 10/2009 | De Ambroggi et al. |
| 2010/0082885 A1 | 4/2010 | Litsyn et al. |
| 2010/0125701 A1 | 5/2010 | Park |
| 2011/0051492 A1* | 3/2011 | Toda .................. G11C 5/025 365/148 |
| 2011/0058431 A1 | 3/2011 | Gunwani et al. |
| 2011/0082967 A1 | 4/2011 | Deshkar et al. |
| 2011/0093652 A1 | 4/2011 | Sharon et al. |
| 2011/0125975 A1* | 5/2011 | Kim .................. G06F 12/0607 711/157 |
| 2011/0167192 A1 | 7/2011 | Iyer et al. |
| 2011/0170346 A1 | 7/2011 | Nagai et al. |
| 2011/0258370 A1 | 10/2011 | Sharon et al. |
| 2012/0023282 A1 | 1/2012 | Rub |
| 2012/0054146 A1 | 3/2012 | Gupta et al. |
| 2012/0096234 A1 | 4/2012 | Jiang et al. |
| 2012/0233396 A1* | 9/2012 | Flynn .................. G06F 3/061 711/108 |
| 2012/0317459 A1 | 12/2012 | Yeo et al. |
| 2013/0024605 A1 | 1/2013 | Sharon et al. |
| 2013/0031313 A1 | 1/2013 | Ryan et al. |
| 2013/0073821 A1 | 3/2013 | Flynn et al. |
| 2013/0073822 A1 | 3/2013 | Sandel et al. |
| 2013/0097403 A1* | 4/2013 | Zheng ................ G06F 12/1036 711/206 |
| 2013/0139023 A1* | 5/2013 | Han .................. G11B 20/1833 714/752 |
| 2013/0148400 A1 | 6/2013 | Murooka |
| 2013/0262903 A1 | 10/2013 | Thevar |
| 2013/0279249 A1* | 10/2013 | Yun .................. G11C 16/10 365/185.03 |
| 2013/0346671 A1 | 12/2013 | Michael et al. |
| 2014/0006898 A1 | 1/2014 | Sharon et al. |
| 2014/0379961 A1 | 12/2014 | Lasser |
| 2014/0379962 A1 | 12/2014 | Lasser |

OTHER PUBLICATIONS

Notice of Allowance and Fee(s) Due mailed May 5, 2015 in U.S. Appl. No. 13/921,626, 15 pages.
Notice of Allowance and Fee(s) Due mailed Oct. 21, 2014 in U.S. Appl. No. 13/921,626, 2 pages.
Non-Final Office Action mailed Mar. 17, 2015 in U.S. Appl. No. 14/100,498, 5 pages.
International Search Report and Written Opinion of the International Searching Authority (EPO) for International Application No. PCT/US2014/043112, mailed Dec. 16, 2014, 17 pages.
Non-Final Office Action mailed Jan. 5, 2015 in U.S. Appl. No. 13/921,566, 6 pages.
Non-Final Office Action mailed Jan. 5, 2015 in U.S. Appl. No. 13/921,626, 6 pages.
Invitation to Pay Additional Fees and, Where Applicable, Protest Fee and Partial International Search Report mailed Oct. 9, 2014 in International Application No. PCT/US2014/043112, 6 pages.
Notice of Allowance and Fee(s) Due mailed Aug. 20, 2014 in U.S. Appl. No. 13/921,566, 8 pages.
Notice of Allowance and Fee(s) Due mailed Aug. 22, 2014 in U.S. Appl. No. 13/921,626, 8 pages.
Lasser, Menahem. "Data Encoding for Non-Volatile Memory," U.S. Appl. No. 13/921,566, filed Jun. 19, 2013, 67 pages.
Lasser, Menahem. "Data Encoding for Non-Volatile Memory," U.S. Appl. No. 13/921,626, filed Jun. 19, 2013, 64 pages.
Lasser, Menahem "Data Encoding for Non-Volatile Memory," U.S. Appl. No. 14/100,498, filed Dec. 9, 2013, 101 pages.
Lasser, Menahem "Data Encoding for Non-Volatile Memory," U.S. Appl. No. 14/100,546, filed Dec. 9, 2013, 100 pages.
Lasser, Menahem "Data Encoding for Non-Volatile Memory," U.S. Appl. No. 14/103,565, filed Dec. 11, 2013, 52 pages.
Notice of Allowance and Fee(s) Due mailed Jul. 28, 2015 in U.S. Appl. No. 14/100,498, 15 pages.
Non-Final Office Action mailed Nov. 25, 2015 in U.S. Appl. No. 14/100,498, 12 pages.
Notice of Allowance and Fee(s) Due mailed Oct. 8, 2015 in U.S. Appl. No. 14/100,546, 15 pages.
Non-Final Office Action mailed Sep. 22, 2015 in U.S. Appl. No. 14/103,565, 31 pages.
Non-Final Office Action mailed Jan. 7, 2016 in U.S. Appl. No. 14/100,546, 11 pages.
International Preliminary Report on Patentability for the International Application No. PCT/US2014/043112, mailed Dec. 30, 2015, 12 pages.

* cited by examiner

FIG. 5

| Previous State | Previous Data | New Data Stage 0 | | New Data Stage 1 | | New Data Stage 2 | | New Data Stage 3 | | New Data Stage 4 | | New Data Stage 5 | | New Data Stage 6 | | New Data Stage 7 | |
|---|---|---|---|---|---|---|---|---|---|---|---|---|---|---|---|---|---|
| | | 0 | 1 | 0 | 1 | 0 | 1 | 0 | 1 | 0 | 1 | 0 | 1 | 0 | 1 | 0 | 1 |
| 1111 | | | | | | | | | | | | | | | | | |
| 1110 | | | | | | | | | | | | | | | | | |
| 1101 | | | | | | | | | | | | | | | | | |
| 1100 | | | | | | | | | | | | | | | | | |
| 1011 | | | | | | | | | | | | | | | | | |
| 1010 | | | | | | | | | | | | | | | | | |
| 1001 | | | | | | | | | | | | | | | | | |
| 1000 | 1 | 0000 | 0001 | | | | | | | | | | | 0000 | 1000 | | |
| 0111 | | | | | | | | | | | | | | | | | |
| 0110 | | | | | | | | | | | | | | | | | |
| 0101 | | | | | | | | | | | | 0000 | 0100 | 0000 | 0100 | | |
| 0100 | 1 | | | | | | | | | 0000 | 0100 | 0000 | 0100 | 0000 | 0100 | 0000 | 0100 |
| 0011 | 1 | | | 0000 | 0001 | 0000 | 0010 | 0000 | 0010 | 0000 | 0100 | 0000 | 0100 | 0000 | 0100 | 0000 | 0100 |
| 0010 | 1 | | | 0000 | 0001 | 0000 | 0010 | 0000 | 0010 | 0000 | 0100 | 0000 | 0100 | 0000 | 0100 | 0000 | 0100 |
| 0001 | 1 | | | 0000 | 0001 | 0000 | 0010 | 0000 | 0010 | 0000 | 0100 | 0000 | 0100 | 0000 | 1000 | 0000 | 1000 |
| 0000 | 0 | 0000 | 0001 | 0000 | 0001 | 0000 | 0010 | 0000 | 0010 | 0000 | 0100 | 0000 | 0100 | 0000 | 1000 | 0000 | 1000 |

| Previous State | Stage 1 | Stage 2 | Stage 3 | Stage 4 | Stage 5 | Stage 6 | Stage 7 | Stage 8 |
|---|---|---|---|---|---|---|---|---|
| 1,1,1,X0 | 1,1,X1,X0 | 1,X2,X1,X0 | X3,X2,X1,X0 | 1,1,X4,1 | 1,X5,X4,1 | X6,X5,X4,1 | X6,X5,X4,X7 | 1,X8,1,1 |

| Previous State | Stage 9 | Stage 10 | Stage 11 | Stage 12 | Stage 13 | Stage 14 | Stage 15 | Stage 16 |
|---|---|---|---|---|---|---|---|---|
| 1,X8,1,1 | X9,X8,1,1 | X9,X8,1,X10 | X9,X8,X11,X10 | X12,1,1,1 | X12,1,1,X13 | X12,1,X14,X13 | X12,X15,X14,X13 | 1,1,1,X16 |

*FIG. 6*

| Previous State | Previous Data | New Data Stage 0 | | New Data Stage 1 | | New Data Stage 2 | | New Data Stage 3 | | New Data Stage 4 | | New Data Stage 5 | |
|---|---|---|---|---|---|---|---|---|---|---|---|---|---|
| | | 0 | 1 | 0 | 1 | 0 | 1 | 0 | 1 | 0 | 1 | 0 | 1 |
| 1111 | 0 | 1100 | 1110 | | | | | | | | | | |
| 1110 | 1 | 1100 | 1110 | 1100 | 1000 | | | | | 1111 | 1110 | 1111 | 1110 |
| 1101 | | | | | | | | | | | | | |
| 1100 | 0 | | | 1100 | 1000 | 0000 | 1000 | | | 1100 | 1110 | 1111 | 1110 |
| 1011 | | | | | | | | | | | | | |
| 1010 | | | | | | | | | | | | | |
| 1001 | | | | | | | | | | | | | |
| 1000 | 1 | | | | | 0000 | 1000 | 1100 | 1000 | 1100 | 1110 | | |
| 0111 | | | | | | | | | | | | | |
| 0110 | | | | | | | | | | | | | |
| 0101 | | | | | | | | | | | | | |
| 0100 | | | | | | | | | | | | | |
| 0011 | | | | | | | | | | | | | |
| 0010 | | | | | | | | 1100 | 1000 | | | | |
| 0001 | | | | | | | | | | | | | |
| 0000 | 0 | | | | | | | | | | | | |

*FIG. 7*

DATA ENCODING FOR NON-VOLATILE MEMORY

FIELD OF THE DISCLOSURE

The present disclosure is generally related to encoding data to be stored in non-volatile memory.

BACKGROUND

Flash memory (both NAND and NOR types) is popular non-volatile solid state memory in use today is. Flash memory is characterized by not being "write-symmetric" when writing data. To illustrate, each storage element of a flash memory can be written from a value of "1" to a value of "0" independently of other storage elements. However, to change a storage element back to a value of "1" a relatively large number of storage elements (called an "erase block") are set to a "1" value as a group. An erase group might contain hundreds of kilobytes or even several megabytes, and flash management systems that manage frequent updates of small chunks of data may implement relatively complex logic to preserve valid data that may be stored at other locations in the erase block.

In recent years, several new "write-symmetric" non-volatile memory technologies have been introduced that do not have the non-symmetry as described for flash memory, such as Resistive RAM (also known as RRAM or ReRAM) and Magnetic RAM (also known as MRAM), as illustrative examples. In these technologies, a storage element may be written in both directions—from "1" to "0" and from "0" to "1"—without imposing a similar operation on storage elements that neighbor the storage element being written.

Memory write latency may affect overall performance of computing systems, such as servers, computers, and mobile electronic devices, as illustrative examples. Improving write latency for non-volatile memory devices may result in improved system performance and an enhanced user experience.

SUMMARY

Mapping and interleaving of data to be stored in a non-volatile memory reduces average write time by increasing the likelihood that either no storage elements in a "skip group" of the storage elements change states from "1" to "0" or that no storage elements in the skip group change states from "0" to "1". A one-to-many mapping may be used that reduces an average number of state changes, such as from "1" to "0" or from "0" to "1", of storage elements of the non-volatile memory.

BRIEF DESCRIPTION OF THE DRAWINGS

FIG. 5 is a table illustrating a particular embodiment of a second mapping that may be applied by the data storage device of FIG. 1;

FIG. 6 is a table illustrating a particular embodiment of a third mapping that may be applied by the data storage device of FIG. 1;

FIG. 7 is a table illustrating a particular embodiment of fourth mapping that may be applied by the data storage device of FIG. 1;

DETAILED DESCRIPTION

Figure 1:
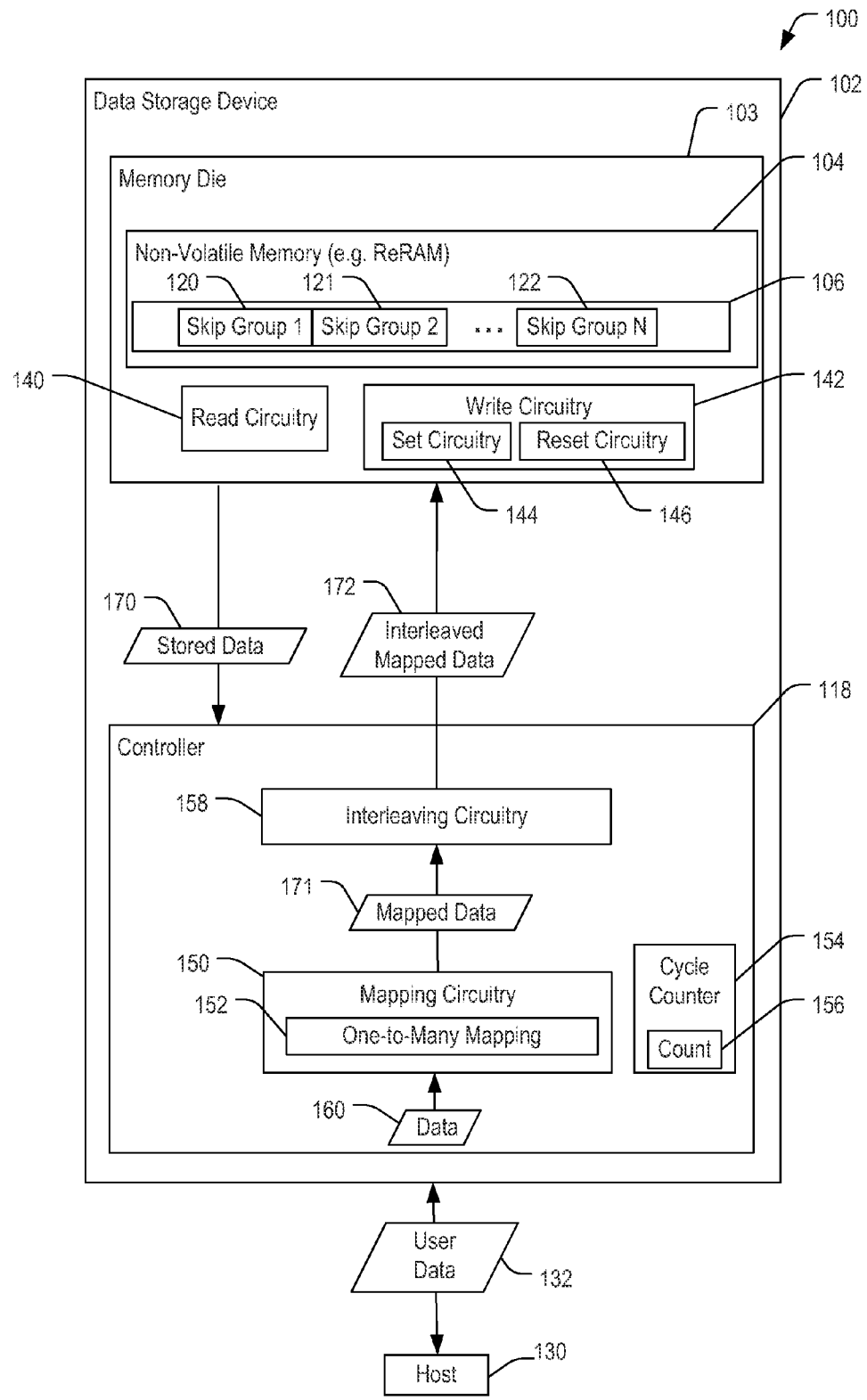
FIG. 1 is a block diagram of a particular illustrative embodiment of a system including a data storage device configured to apply a mapping and to interleave mapped values to reduce average write time of a non-volatile memory.

Referring to FIG. 1, a particular embodiment of a system 100 includes a data storage device 102 coupled to an accessing device such as a host device 130. The data storage device 102 is configured to apply a mapping 152 and to interleave mapped data 171 to reduce average write time of a non-volatile memory 104.

The host device 130 may be configured to provide data, such as user data 132, to be stored at the non-volatile memory 104 or to request data to be read from the non-volatile memory 104. For example, the host device 130 may include a mobile telephone, a music player, a video player, a gaming console, an electronic book reader, a personal digital assistant (PDA), a computer, such as a laptop computer, a notebook computer, or a tablet, any other electronic device, or any combination thereof. The host device 130 communicates via a memory interface that enables reading from the data storage device 102 and writing to the data storage device 102. For example, the host device 130 may operate in compliance with a Joint Electron Devices Engineering Council (JEDEC) industry specification, such as eMMC specification. As other examples, the host device 130 may operate in compliance with a universal serial bus (USB) or a universal flash storage (UFS) specification. The host device 130 may communicate with the data storage device 102 in accordance with any other suitable communication protocol.

The data storage device 102 includes the non-volatile memory 104 coupled to a controller 118. For example, the data storage device 102 may be configured to be coupled to the host device 130 as embedded memory. As another example, the data storage device 102 may be a memory card. The data storage device 102 may operate in compliance with a JEDEC industry specification. For example, the data storage device 102 may operate in compliance with a JEDEC specification, one or more other specifications, or a combination thereof.

The non-volatile memory 104 may be on a memory die 103 that is separate from the controller 118 and coupled to the controller 118 via a bus. However, in other implementations, the non-volatile memory 104 and the controller 118 may be on a common die. The non-volatile memory 104 includes a memory such as a resistive random access memory (ReRAM) that can write data to individual storage elements by changing a stored data value of "1" to "0" (e.g., a "set" operation that changes the storage element from a first state to a second state) or by changing a stored data value of "0" to "1" (e.g., a "reset" operation that changes the storage element from the second state to the first state). The non-volatile memory 104 includes a write-symmetric memory such as a write-symmetric ReRAM.

The non-volatile memory 104 includes a representative group 106 of storage elements, such as a word line. The storage elements in the group 106 are partitioned into multiple "skip groups" including a first skip group 120, a second skip group 121, to an Nth skip group 122. When writing data to the group 106, bits to be written into one or more of the skip groups 120-122 may be examined to determine whether all of the bits of any of the skip groups 120-122 do not transition from a "1" value to a "0" value (a "1-to-0" transition). When one or more of the skip groups 120-122 is identified as having no 1-to-0 transitions associated with writing the data, a set operation may be avoided in the identified skip group during programming of the data. Similarly, when one or more of the skip groups 120-122 is identified as having no 0-to-1 transitions associated with writing the data, a reset operation may be avoided in the identified skip group during programming of the data. Avoiding one or more set operations or reset operations at the skip groups 120-122 may reduce a latency associated with the one or more set operations or reset operations and may therefore reduce a data write time to the non-volatile memory 104.

Each of the skip groups 120-122 is configured to enable skipping of the set operation, skipping of the reset operation, or both, independent of whether any other of the skip groups 120-122 skip the set operation and/or the reset operation. In some implementations, the skip groups 120-122 are "architectural" skip groups, i.e., the skip groups 120-122 represent the smallest groups of storage elements defined by the memory architecture that can be skipped independent of the other groups during a write operation. In other implementations, each or some of the skip groups 120-122 is formed by combining two or more such architectural skip groups. For example, the first skip group 120 may be formed of two smaller skip groups that are operated together for purposes of interleaving mapped data for storage in the non-volatile memory 104.

Read circuitry 140 and write circuitry 142 are coupled to the non-volatile memory 104 and are configured to enable operations of reading data from storage elements of the non-volatile memory 104 and writing data to storage elements of the non-volatile memory 104, respectively. The write circuitry 142 includes set circuitry 144 that is configured to cause a "set transition" that changes a stored value in one or more selected storage elements from a "1" value to a "0" value by causing a transition from the first state to the second state. The write circuitry 142 also includes reset circuitry 146 that is configured to cause a "reset transition" that changes a stored value in one or more selected storage elements from a "0" value to a "1" value by causing a transition from the second state to the first state.

The controller 118 is configured to receive data and instructions from and to send data to the host device 130. The controller 118 is further configured to send data and commands to the non-volatile memory 104 and to receive data from the non-volatile memory 104. For example, the controller 118 is configured to send data and a write command to instruct the non-volatile memory 104 to store the data to a specified address. As another example, the controller 118 is configured to send a read command to read data from a specified address of the non-volatile memory 104.

The controller 118 includes mapping circuitry 150 that is configured to apply the mapping 152 to received data 160 (e.g., user data 132 received from the host device 130) to generate mapped data 171. The mapping 152 is a one-to-many mapping that may be configured to reduce average write time of writing data to storage elements of the non-volatile memory 104, such as to the group 106, by mapping at least one incoming data value to a mapped value such that at least one of a first operation to cause a set transition or a second operation to cause a reset transition is not required for storing the mapped value into the storage elements. For example, the mapping 152 may sometimes enable storing data into the group 106 by changing one or more storage elements from a "1" state to a "0" state without changing any storage elements from the "0" state to the "1" state. An example application of the mapping 152 is described in further detail with respect to FIG. 4.

The mapping 152 may be further configured to reduce an average number of state changes of storage elements in the non-volatile memory 104 per write operation. The mapping 152 may therefore increase an average reliability of the non-volatile memory 104 by reducing the average number of state changes. The "average reliability" of the non-volatile memory 104 is an average across multiple groups of storage elements in the non-volatile memory 104 and/or across multiple such memories. The "average number of state changes" of a storage element in a group of storage elements, such as the group 106, is an average count of state changes per write operation for that storage element for multiple write operations performed on the group. For example, the mapping 152 may be a one-to-many mapping corresponding to the coding schemes of FIG. 5, FIG. 6, or FIG. 7, as illustrative, non-limiting examples.

The controller 118 includes interleaving circuitry 158 that is configured to interleave the mapped data 171 to generate interleaved mapped data 172. For example, the mapped data 171 may include multiple groups of bits of data, and the interleaving circuitry 158 may be configured to cause a first bit of each of the multiple groups of bits to be stored in the first skip group 120, a second bit of each of the multiple groups of bits to be stored in the second skip group 121, etc. An example of operation of the mapping circuitry 150 and the interleaving circuitry 158 is described with respect to FIG. 2.

The controller 118 also includes a cycle counter 154 configured to update a count 156 of write operations. For example, the controller 118 may be configured to send a page of data to be stored at the group 106 (e.g., where the group 106 is sized to store the page of data), and the cycle counter 154 may be configured to track a number of write operations that have been performed at the group 106. The mapping circuitry 150 may access the cycle counter 154 and apply the mapping 152 in accordance with a value of the count 156, such as described in further detail with respect to FIG. 3.

During operation, the user data 132 may be received from the host device 130 by the controller 118. For example, the user data 132 may include data to be stored at the non-volatile memory 104 and may be accompanied by a logical or physical address indicating a destination address for storage of the user data 132. The user data 132 may be addressed to be stored at the group 106 of storage elements (e.g., as a page of data that fills the group 106, or as a smaller unit of data to be stored in a portion of the group 106).

The controller 118 may provide the user data 132 to the mapping circuitry 150 as the data 160. Alternatively, the controller 118 may process the user data 132 to generate the data 160, such as by applying an error correction coding (ECC) operation. For example, the ECC operation may generate parity bits that may be combined with the user data 132 to form an ECC codeword. The ECC codeword may be provided to the mapping circuitry 150 as the data 160.

The mapping circuitry 150 may select the mapping 152 at least partially based on data that is already stored in the group 106 of storage elements and that is read from the group 106. For example, the controller 118 may send a read command to the non-volatile memory 104 to read data stored in the group 106. In response, the non-volatile memory 104 may return stored data 170 to the controller 118. In other implementations, the mapping circuitry 150 may access the cycle counter 154 and may select the mapping 152 at least partially based on the count 156 (e.g., without reading the stored data 170), such as described further with respect to FIGS. 3-7. The mapped data 171 may be interleaved by the interleaving circuitry 158 to generate the interleaved mapped data 172. To illustrate, bits within the mapped data 171 may be repositioned by the interleaving circuitry 158 so that bits that are adjacent to each other in the mapped data 171 are distributed across multiple skip groups 120-122 when stored in the non-volatile memory 104.

By applying the mapping 152 to the data 160 and interleaving the mapped data 171, the resulting interleaved mapped data 172 may be more likely to be stored into the non-volatile memory 104 without using the set circuitry 144 or the reset circuitry 146 in one or more of the skip groups 120-122 as compared to storing the data 160 without mapping or as compared to storing the mapped data 171 without interleaving. As a result, a write time for the interleaved mapped data 172 may be reduced as compared to storing the data 160 without interleaving. In addition, the interleaved mapped data 172 may be more likely to be stored into the non-volatile memory 104 with fewer storage elements changing state as compared to storing the data 160 without interleaving. Applying the mapping 152 may cause an average number of state changes of the storage elements per write operation to be reduced as compared to storing unmapped data, resulting in increased reliability of the non-volatile memory 104, as described in further detail with respect to FIG. 5.

In some implementations, the non-volatile memory 104 may be configured to write data to relatively small chunks of storage elements (such as a byte or a word) in a single write operation, while in other implementations the non-volatile memory 104 may be configured to write data to relatively large chunks of storage elements (such as pages of 2 kilobytes or 4 kilobytes). Regardless of the size of the chunk being written, a sequence of events when executing a write command may include:

a. The data storage device 102 receives a write command that specifies the address to be written and the new data chunk (e.g., the user data 132) to be stored at that address. The specified address may be a logical address or a physical address.

b. If the specified address is a logical address the data storage device 102 translates the logical address to a physical address. The data storage device 102 internally reads from the physical address in the memory 104 the currently existing data at the targeted storage elements (e.g., the stored data 170).

c. Logic in the data storage device 102 classifies the targeted storage elements into (1) storage elements that already store their target value, (2) storage elements that store a "1" and have a target value of "0", and (3) storage elements that store a "0" and have a target value of "1".

d. The data storage device 102 writes all of the storage elements that store a "1" and have a target value of "0" (i.e., storage elements in "(2)" above) to have the value "0" using the set circuitry 144.

e. The data storage device 102 writes all the storage elements that store a "0" and have a target value of "1" (i.e., storage elements in "(3)" above) to have the value "1" using the reset circuitry 146.

Thus, a write operation may be internally translated into three memory array operations: reading before writing ("RBW"), writing the storage elements that need to be set to "0" (the "set pass"), and writing the storage elements that need to be reset to "1" (the "reset pass").

As described above and used throughout the present disclosure, a convention is adopted where a "set" operation switches a storage element from storing a "1" value to storing a "0" value, and a "reset" operation switches a storage element from storing a "0" value to storing a "1" value. However, it should be understood that the systems and methods described in the present disclosure are equally applicable to an opposite definition where the "set" operation switches a storage element from storing a "0" value to storing a "1" value and a "reset" operation switches a storage element from storing a "1" value to storing a "0" value.

In addition, the systems and methods described herein do not depend on the physical implementation of how the "set" and "reset" operations are applied to a storage element. For example, in a ReRAM memory that switches between a low-resistance state and a high-resistance state, a "set" may switch a ReRAM storage element from low resistance to high resistance and a "reset" may switch the ReRAM storage element from high resistance to low resistance. Alternatively, a "set" may switch a ReRAM storage element from high resistance to low resistance and a "reset" may switch the ReRAM storage element from low resistance to high resistance. Both alternatives are equally valid for the purposes of the present disclosure. Likewise, the systems and methods described in the present disclosure are not dependent on any particular association between a storage element's physical state (e.g., low resistance vs. high resistance) and the logical value ("0" vs. "1") stored in the storage element.

The non-volatile memory 104 provides a mechanism to save time during programming by skipping a set operation, a reset operation, or both, with respect to one or more "skip groups" of storage elements that need not change state, such as the representative skip groups 120-122. As an illustrative, non-limiting example, each skip group 120-122 may include a sufficient number of storage elements to store 32 bytes of data (e.g., 32×8=256 storage elements) in adjacent storage elements that are aligned on a 32-bytes boundary. As another example, each skip group 120-122 may be a group of 64×8=512 adjacent storage elements that are aligned on a 64-bytes boundary.

Before performing a set operation, the data storage device 102 (e.g., the write circuitry 142) may check the storage elements of each skip group 120-122 to determine whether any storage element of the skip group is to be set. If no storage elements in a skip group are to be set, the skip group is skipped during the set operation and a time to perform the set operation of the skip group is saved. Before performing a reset operation, the data storage device 102 may check the storage elements of each skip group 120-122 to determine whether any storage elements of the skip group are to be reset. If no storage elements in a skip group are to be reset, the skip group is skipped during the reset operation and a time to perform the reset operation of the skip group is saved.

Without the interleaving circuitry 158, much of the potential time savings generated by use of the skip groups 120-122 may be unavailable. To illustrate, in order for a skip group 120-122 to be skipped during a set pass or during a reset pass, all of the storage elements of the skip group must not need setting, or all of the storage elements of the skip group must not need resetting. If a single storage element in a skip group requires setting (or resetting), the skip group is not skipped. For random data, the probability that a single storage element requires setting (or resetting) in a page write operation is 25%. Therefore, the probability of not having a single element to be set (or reset) within a skip group is equal to 0.75 raised to the power of the number of storage elements in the skip group. For a skip group of 32 bytes, the probability of not having a single element to be set (or reset) within a skip group is approximately $10^{-32}$. For a skip group of 8 bytes, the probability of not having a single element to be set (or reset) within a skip group is approximately $10^{-8}$. As a result, for random data, it is highly improbable that actual write time saving is achieved without use of the interleaving circuitry 158.

In an illustrative example, the mapping 152 may map a data value having K data bits into a mapped value having N mapped bits, where N and K are positive integers and N>K. The K bits may be a portion of a larger data chunk, and the procedures outlined below can be applied to multiple groups of K bits that together constitute the data chunk to be written. For example, the non-volatile memory 104 may accept write commands for pages having sizes of one or more kilobytes.

N storage elements of the non-volatile memory 104 may be allocated for storing the K data bits. K data bits implies 2K different data values may be stored, while N storage elements implies $2^N$ different storage states are available, where $2^N>2^K$. Having more storage states than values enables the mapping 152 to assign multiple states to represent one or more of the data values.

For a write command, the following procedure may be performed:

1. The data storage device 102 receives a write command from an external device (e.g., from the host device 130), with the write command specifying the address to be written and a data chunk to be stored at that address. If the specified address is a logical address the data storage device 102 translates the logical address to a physical address.

2. The data storage device 102 reads the current contents of the storage elements that correspond to the physical address specified for the data chunk.

3. According to the values of each group of K data bits in the data chunk (and possibly additional state information regarding the storage elements, such as a cycle count), a corresponding group of N mapped bits is determined to represent the K data bits.

4. Each group of N mapped bits is interleaved across skip groups of the storage elements.

For a read command, the following procedure may be performed:

1. The data storage device 102 receives a read command from an external device (e.g., from the host device 130), with the read command specifying an address from which data is to be read. If the specified address is a logical address the data storage device 102 translates the logical address to a physical address.

2. The data storage device 102 reads the contents of the storage elements that correspond to the physical address specified for the data.

3. Data bits from each skip group of the storage elements are de-interleaved to form multiple groups of N mapped bits.

4. Each group of N mapped bits is translated to a value of K data bits to form a data chunk of multiple groups of K data bits, which is then output to the external device (e.g., sent to the host device 130).

Figure 2:
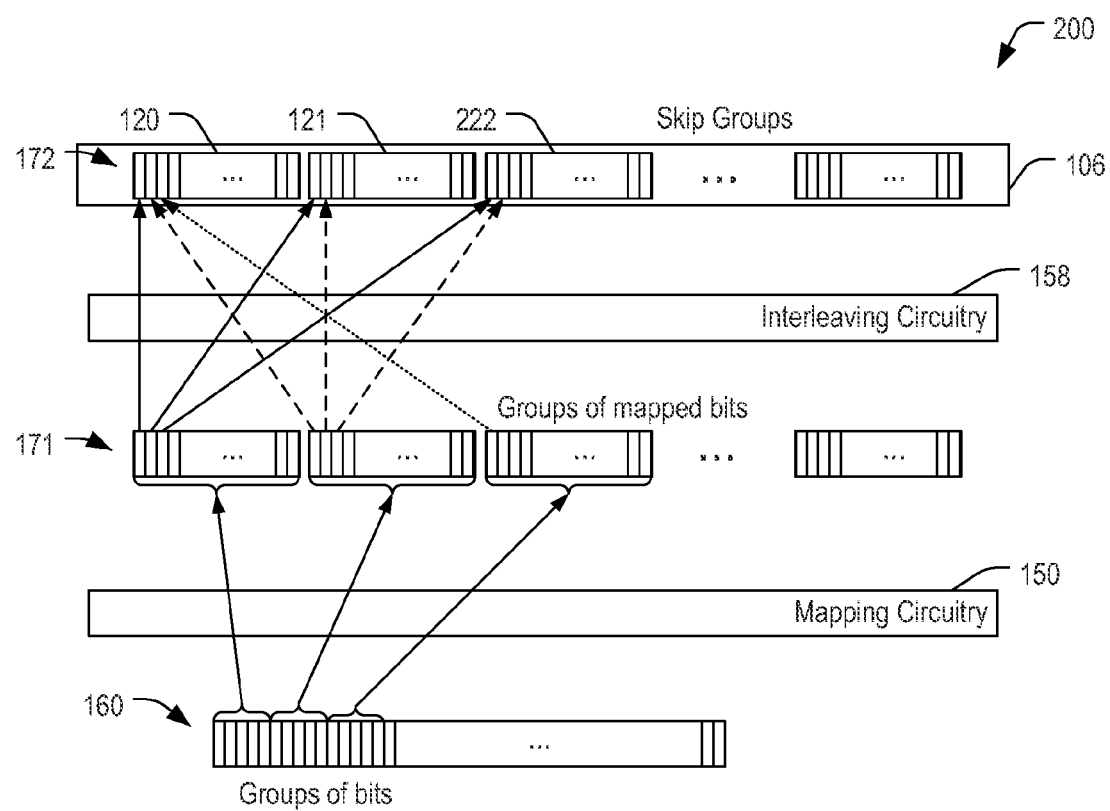
FIG. 2 is a diagram that illustrates mapping and interleaving that may be performed by the data storage device of FIG. 1.

FIG. 2 depicts a particular embodiment of mapping the data bits of the data 160 and interleaving the bits of the mapped data 171 of FIG. 1. The mapping circuitry 150 is configured to apply a mapping to each group of K data bits in the data 160 to generate multiple groups of N mapped bits in the mapped data 171. For example, a first group of K data bits in the data 160 may be mapped to a first group of N mapped bits in the mapped data 171, a second group of K data bits in the data 160 may be mapped to a second group of N mapped bits in the mapped data 171, etc.

The interleaving circuitry 158 is configured to interleave the groups of mapped bits to form the interleaved mapped data 172 to be written to skip groups of storage elements 120, 121, 222, etc. For example, the first bit of each group of mapped bits may be written to the first skip group of storage elements 120, the second bit of each group of mapped bits may be written to the second skip group of storage elements 121, the third bit of each group of storage elements may be written to the third skip group of storage elements, etc. As a result, the first skip group 120 may include first mapped bits having a first bit position in each of the groups of mapped bits, the second skip group 121 may include second mapped bits having a second bit position in each of the groups of mapped bits, etc. Each bit of a single group of mapped bits may be written to different skip groups of storage elements 120, 121, 222, etc.

As described in further detail with respect to FIGS. 3-7, the mapping circuitry 150 may synchronize mapping of each of the groups of bits in the data 160 according to the cycle count 156 of FIG. 1 in a manner so that relatively few of the mapped bits may change state at any given cycle, and the position of the changing bits may be uniform over the groups of mapped bits. Using the mapping illustrated in FIG. 4 as an example, at stage 0 each group of mapped bits may have the value '1111' or '1110', and at stage 1 each group of mapped bits may have the value '1100' or '1110'. At stage 1, the bit values in the first and second bit positions do not change from the bit values at stage 0, while the bit values in the third and fourth bit positions may change from the bit values at stage 0. As a result, set operations and reset operations at the first and second skip groups of storage elements 120 and 121 (storing only values from the first bit position and the second bit position, respectively) may be skipped when writing data at stage 1.

FIG. 2 illustrates an efficient utilization of the write skipping feature for reducing writing time by interleaving the N storage elements of a mapping group across the skip groups of storage elements 120-222 instead of having all of the storage elements of a mapping group be adjacent to each other. Although the mapping scheme of FIG. 4 may achieve write time improvements when implemented without interleaving (due to the elimination of reset operations at three of four stages), further write time efficiency is gained when the mapped groups are interleaved into multiple skip groups. Interleaving the mapped groups across the skip groups of storage elements 120-222 provides the write time benefit of the mapping scheme in addition to the write time efficiency enabled by using skip groups with interleaved mapped data.

A "full interleaving" scheme may be implemented that includes dividing the group of storage elements 106 (e.g., a page of storage cells) into N equal portions that are each a skip group, and each group of N mapped bits has one storage element in each portion of the group of storage elements 106. To illustrate, the first skip group 120 may have a first storage element corresponding to a first bit position of the first group of mapped bits (e.g., the first group of mapped bits of FIG. 2), a second storage element corresponding to the first bit position of the second group of mapped bits (e.g., the second group of mapped bits of FIG. 2), and an Nth storage element corresponding to the first bit position of the Nth group of mapped bits. Similarly, the second skip group 121 may have a first storage element corresponding to the second bit position of the first group of mapped bits, a second storage element corresponding to the second bit position of the second group of mapped bits, and an Nth storage element corresponding to the second bit position of the Nth group of mapped bits. A last skip group of the storage elements may have a first storage element corresponding to the last bit position of the first group of mapped bits, a second storage element corresponding to the last bit position of the second group of mapped bits, and an Nth storage element corresponding to the last storage element of the Nth group of mapped bits. Interleaving has the advantage that "corresponding" bit positions of the multiple mapping groups, that are correlated in the type of operations they go through at the same time, are clustered together in the same skip groups, thereby increasing the probability that one or more skip groups can be skipped.

As long as the size of the page is at least N times the size of an architectural skip group, full interleaving may be implemented. However, it should be understood that the full interleaving scheme is just one of many possible interleaving schemes that may be implemented to populate skip groups of storage elements by bits that have the same position in their corresponding mapping groups. For example, in an implementation where skip groups have a size of 32 bytes and N equals 4, each section of 32 bytes (that is aligned to 32 bytes) hosts only mapped bits that are all first in their mapping groups, or all second in their mapping groups, or all at position "i" of their mapping groups (even though not all groups of mapped bits are represented in a section of 32 bytes). For clarity of explanation, examples are provided for implementations using a full interleaving scheme. However, resulting write time results may be equally applicable to any other interleaving schemes that populate skip groups by bit position in the mapping groups.

Figures 3, 4:
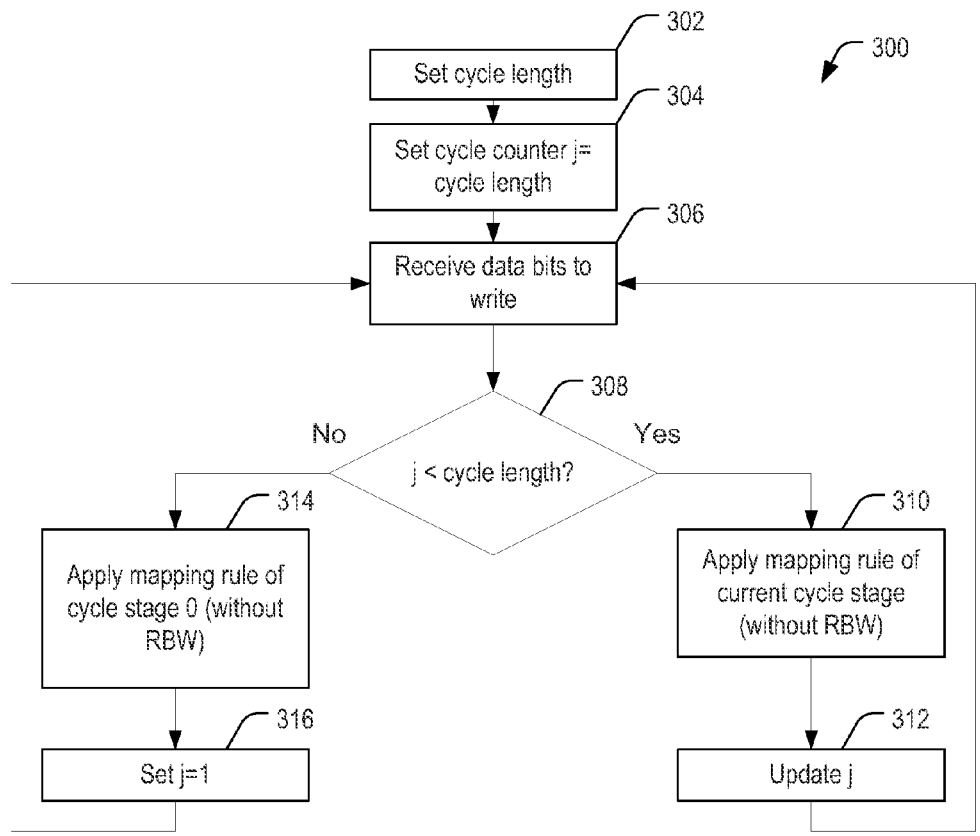
FIG. 3 is a flow chart of a particular embodiment of a method of writing data that may be performed by the data storage device of FIG. 1.
FIG. 4 is a table illustrating a particular embodiment of a first mapping that may be applied by the data storage device of FIG. 1.

FIG. 3 illustrates an embodiment of a process that may be applied by the mapping engine 150 of FIG. 1. The process 300 may be applied to map incoming data values to mapped values to be stored in a memory, such as the non-volatile memory 104, where the next state of storage elements is not based on the previous state of the storage elements.

A cycle length may be set, at 302. The cycle length may correspond to a number of stages in a cycle of write operations, and a mapping may include different mapping rules corresponding to different stages of the cycle. The mapping may be configured to reduce an average number of state changes of the storage elements per write operation and/or to increase a number of write operations that do not require one or both of a reset pass or a set pass, such as the mapping schemes illustrated with respect to FIGS. 4-7. A cycle counter "j" may be set to an initial value, such as equal to the cycle length, that indicates a current stage in the cycle of write operations, at 304. For example, the cycle counter may correspond to the count 156 of FIG. 1.

Data bits to write are received, at 306, and a determination is made whether the cycle count "j" is less than the cycle length, at 308. When the cycle count "j" is less than the cycle length, a mapping rule corresponding to the current stage of the cycle is applied (e.g., without performing a read before write operation), at 310, and j is updated (e.g., j=j+1), at 312.

Otherwise, in response to determining that the cycle count "j" is not less than the cycle length, the mapping rule of the first stage of the cycle (e.g., stage 0) is applied (e.g., without performing a read before write operation), at 314, and j is set to 1, at 316.

The process 300 enables application of a coding scheme (i.e., the mapping) that is independent of the previous state of storage elements to determine a next state of the storage elements by allocating write operations into fixed-length cycles composed of multiple stages. Such coding schemes may include transition rules that are different for different stages, such as based on the stage number in the cycle and the new data bits.

As explained above, a frequency of state transitions that do not require "reset" operations for any storage element or that do not require "set" operations for any storage element may be increased by applying a mapping as compared to storing the received data value without applying the mapping. When a state transition does not require resetting any storage elements in a skip group, the reset pass may be skipped in the skip group, reducing the write time as compared to performing the reset pass. When a state transition does not require setting any storage elements in a skip group, the set pass may be skipped in the skip group, reducing the write time as compared to performing the set pass. An amount of reduction of the write time may depend on the time required by the memory for the set pass, the reset pass, the reading before writing (RBW) operation, and any command handling overhead of the memory. As an illustrative example, in an implementation that does not include interleaving mapped bits across skip groups, a reduction of 20% to 40% of the write time may be obtained when comparing a one-pass write operation (e.g., set operations and no reset operations) against two-pass write operation (e.g., set operations and reset operations). Note that performing a RBW stage is not considered a "pass" for determination of whether a write operation is a one-pass or two-pass write operation. In memory devices that allow write operations (both one-pass and two-pass) to be performed without reading the storage elements before writing, write time improvements may be further enhanced by avoiding the RBW stage.

In some circumstances, the process 300 may result in faster average write times than processes that are not based on cycle length and that are instead based on the pervious state of the storage elements. For example, in a device where relatively large pages of data that contain multiple groups of N mapped bits are to be written to the memory, the data of one group of N mapped bits for one page may not be the same as the data of another group of N mapped bits for the same page. Each group of N mapped bits may follow a different sequence of states and as a result bit positions that remain unchanged in a first group of mapped bits in a page may not remain unchanged in a second group of mapped bits in the same page. As the number of groups in a single page increases, a likelihood that at least one of the groups in the page changes value at a particular bit position increases, so that after interleaving the groups of mapped bits into skip groups there is a lower likelihood that any skip group may be skipped.

By using the cycle count, the process 300 synchronizes groups of mapped bits that share a common page such that all groups start and end their cycles at the same time. This also implies that all groups of mapped bits have the same cycle length that is pre-determined and that is not affected by the data values being written. In addition, synchronizing groups of mapped bits enables state transitions to be restricted to particular bit positions in each group at each stage of the cycle, which after interleaving enables skipping of skip groups corresponding to non-transitioning bit positions at each stage. In the context of the process 300, the meaning of the term "cycle" is the number of iterations of the 306-308-310-312 sequence until the cycle count is reset, plus one. In addition to potential write time improvement for large data pages due to synchronization of the groups, the process 300 may also reduce write time by not performing a RBW stage before any write operation.

FIG. 4 illustrates a transitions table 400 for a coding scheme where K=1 and N=4. In the coding scheme of FIG. 4, the cycle length is four. The mapping rules are dependent on the stage number in the cycle and are not dependent on the previous state. The mapping rules may be implemented as:

a) In stage 1, select state "1111" for data "0" and select state "1110" for data "1".

b) In stage 2, select state "1100" for data "0" and select state "1110" for data "1".

c) In stage 3, select state "1100" for data "0" and select state "1000" for data "1".

d) In stage 4, select state "0000" for data "0" and select state "1000" for data "1".

Without interleaving the mapped data, the coding scheme of FIG. 4 provides a write time benefit as compared to storing random data because stages 1, 2, and 3 include set operations but avoid reset operations, while stage 0 includes reset operations but avoids set operations. As a result, write time may be reduced as compared to performing set operations and reset operations at every stage. Additional write time improvement is attained by interleaving the mapped data into four sections (e.g., four skip groups 120-122, each sized to span one-quarter of a page), such as via the interleaving circuitry 158 of FIG. 1.

To illustrate, in stages 1, 2, and 3, the set operation may be required only for two of the four storage elements used to store the mapped data. When interleaved, this translates to only two of the four sections of the page being programmed using the set operation while the other two sections are skipped. For stage 0, the set operation may be skipped for all four of the sections. In a fully-interleaved implementation of the data storage device 102 of FIG. 1 where the non-volatile memory 104 of FIG. 1 has four skip groups per page, the set operation may be skipped at two skip groups for each of stages 1-3 and may be skipped in all four skip groups for stage 0. With respect to the reset operation, stages 1, 2 and 3 have no reset pass, so all four sections may be skipped, and in stage 0 no section may be skipped. Interleaving the mapped data into four skip groups therefore results in a write time improvement in stages 1, 2, and 3, as compared to a non-interleaved implementation, due to the set operation being skipped in one-half of the storage elements at each of these stages.

Write time improvement indicated as a result of interleaving the coding scheme of FIG. 4 is based on the amount of skipping that is guaranteed to occur by the rules of the coding scheme (i.e., at stage 1, skipping is guaranteed in two sections because the coding scheme does not allow the first two bits to change values). The specific values of the user data may enable additional skipping if a skip group that is not guaranteed to be skipped (e.g., the third bit at stage 1) is determined to require no set or no reset operation. As an example, the third bit for every group of mapped data at stage 0 is "1". If the user data at stage 1 is all-1's, the third bit for every group of mapped data at stage 1 remains "1" and can be skipped. However, as explained above, the probability for this to happen with random data becomes small as the number of groups increases.

FIG. 5 illustrates a transitions table 500 for a coding scheme with a cycle length of 8 and a change probability of 18.75% with changes uniformly distributed across the storage elements so as to also provide an endurance gain. In a non-interleaved implementation, this coding scheme provides no write time gain because no write operation along the cycle can be guaranteed to be a fast (one-pass) operation.

However, in each of the 8 stages, the set operation may be required for only one of the four storage elements. When interleaved into four quarter-page sections, the set operation may be applied to only one of the four sections of the page, and the other three sections can be skipped. In each of the 8 stages, the reset operation may be required for only one of the four storage elements. When interleaved, the reset operation may be applied to only one of the four sections of the page, and the other three sections can be skipped. As a result, a write time saving is achieved in both the set and the reset passes as compared to a non-interleaved implementation.

FIG. 6 depicts a transitions table 600 that represents transition rules for {K=1, N=4} with reference to the bits in the sequence {X1, X2, X3, X4, . . . , Xi, . . . }. In FIG. 6, X0 represents a last bit of a prior sequence that precedes X1. The coding scheme of FIG. 6 has a cycle of 16 stages that may be divided into 4 sub-cycles of 4 stages. Each sub-cycle has three stages with only set operations (e.g., stages 1, 2, and 3) and one stage that may include set operations and reset operations (e.g., stage 4). In a non-interleaved implementation, the coding scheme of FIG. 6 provides similar (non-interleaved) write time gain as the {K=1, N=4} coding scheme of FIG. 4, where three out of each four stages have only set operations. The coding scheme of FIG. 6 has a change probability of 21.875% that is uniformly distributed, as compared to the 37.5%, non-uniformly distributed change probability of the coding scheme of FIG. 4.

However, in each of the 16 stages of the coding scheme of FIG. 6, the set operation may be required only for one of the four storage elements. When interleaved, the set operation is applied to only one section (of four one-quarter sections) of the page at each stage, while the other three sections are skipped. With respect to the reset operation, no additional write time improvement is enabled by interleaving as compared to a non-interleaving implementation, because stages 1, 2, 3, 5, 6, 7, 9, 10, 11, 13, 14, and 15 have no reset pass and no section may be skipped in the remaining stages (stages 4, 8, 12, and 16).

FIG. 7 illustrates an example of a transitions table 700 for a {K=1, N=4} coding scheme that has a cycle of length 6. The first three stages include set operations and do not include reset operations. The last three stages include reset operations and do not include set operations.

The coding scheme of FIG. 7 provides a storage element change probability of 25% that is uniformly distributed across all storage elements. In this example, only three of the six stages (stages 0, 1, and 2) have a set pass, and for all of these three stages the set operation may be required only for two of the four storage elements. When interleaved, the set operation is applied to only two sections (of four one-quarter sections) of the page for each of stages 0, 1, and 2, while the other two sections are skipped.

Similarly, only three of the six stages (stages 3, 4, and 5) have a reset pass, and for all of these three stages the reset operation may be required only for two of the four storage elements. When interleaved, the reset operation is applied to only two sections (of four one-quarter sections) of the page for each of stages 3, 4, and 5, while the other two sections are skipped.

Although described with respect to {K=1, N=4} coding schemes as depicted in FIGS. 4-7, write time improvement resulting from interleaving mapped data to skip groups as described with respect to FIGS. 1-2 can be attained for coding schemes using any values of {K, N}, where K and N are positive integers and N>K. In addition, although coding schemes to improve reliability and average write speed have been described with respect to an implementation using one-bit-per-storage element (SLC) memory devices, such coding schemes may be adjusted to be implemented using multi-bit-per-storage element (MLC) memory devices.

For example, a group of N MLC storage elements (where N>1) each storing B bits per storage element (B>1) can function as a group of N*B SLC storage elements. Methods described herein for mapping data to be stored into a group of N*B SLC storage elements may alternatively be applied to a group of N MLC storage elements (storing B bits per storage element) to match or exceed the average write time gains due to interleaving as described above in the context of SLC implementations.

To illustrate, states of two SLC storage elements may be compared to states of a single 2 bit-per-storage element MLC storage element. Both configurations (2 SLC vs. 1 MLC) store two bits and have four possible states. Using the convention that the four states of the MLC storage element represent the data bit values {11,10,01,00} ordered according to their distance from the "reset" state and listed from closest to furthest, and that the two states of the SLC storage elements represent the data bit values {1,0}, it is noted that although both configurations have the same available states, in the SLC configuration the transition from "10" to "01" requires one of the storage elements to be set and the other to be reset. However, in the MLC configuration the transition from "10" to "01" is performed by altering the state of the storage element in the direction of the set operation. As a result, the MLC configuration should enable write performance improvement that is at least the same as the SLC configuration. The MLC configuration may enable further improved write performance in terms of the length of the cycles that may be attained.

In an MLC implementation, the change probability of a storage element is not necessarily equal to the change probability of a bit (as is the case with SLC). Minimizing the change probability of a MLC storage element includes minimizing the probability that any bit of the MLC storage element changes its value. Therefore, the assignment of bits to storage elements may be selected to achieve reduced probability that any bit stored in a MLC storage element changes its state per write operation.

A mapping to improve average write time based on applying interleaving for efficient use of skip groups may be used with memory devices that write large pages at a time. For example, a page may have a size of 1 kilobyte (Kbyte) and a {K=1, N=4} mapping may be implemented using 2048 groups per page. From a host device perspective, the number of data bits stored in a page is 256 bytes because each of the 2048 groups contributes a single data bit. In this case, there might be a difference between the logical address of bits within the page and the physical address of the bits. For example, if the memory supports reading of individual bytes from a memory buffer and if a host device requests to read the last data byte in the page (logical byte 255 from the host point of view), the bytes that are to be physically read are the last bytes in each of the four skip groups of the physical page in a fully interleaved implementation (e.g., when the four skip groups span physical bytes 0-255, 256-511, 512-767, and 768-1023, respectively, physical bytes 255, 511, 767, and 1023 are read). The reading circuitry (e.g., read circuitry 140 of FIG. 1) may perform logical-to-physical conversions (according to the N and K values) to access the correct data.

Figure 8:
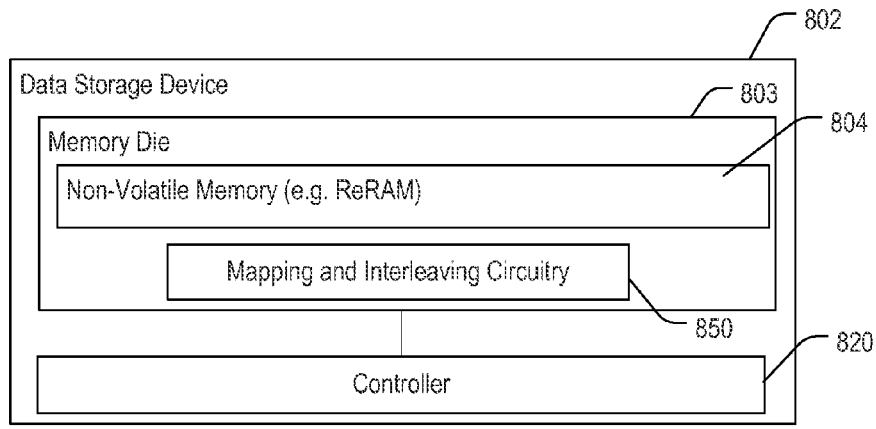
FIG. 8 is a block diagram of a particular embodiment of a data storage device configured to interleave mapped data to reduce average write time.

FIG. 8 illustrates an example of a data storage device 802 that includes a controller 820 coupled to a memory die 803. The memory die 803 includes a non-volatile memory 804 (e.g., a ReRAM) and mapping and interleaving circuitry 850. The mapping and interleaving circuitry 850 may be configured to operate as described with respect to the mapping circuitry 150 and the interleaving circuitry 158 of FIG. 1, such as by applying a mapping according to one or more of the coding schemes of FIGS. 4-7 and applying an interleaving scheme according to FIG. 2, as illustrative examples. Although the controller 820 is illustrated as distinct from the memory die 803, in other implementations the controller 820 and the non-volatile memory 804 may be on a common die. By including the mapping and interleaving circuitry 850 on the memory die 803, additional time savings may be achieved in implementations that perform a RBW stage by avoiding transfer of stored data to the controller 820 (e.g., the stored data 170 of FIG. 1).

The methods of the present disclosure can be implemented in a way that is transparent to the host or the controller. The host or the controller can send successive write commands to a specific page (without specifying an offset within the page) and the mapping and interleaving mechanisms take care of placing the data in the right place in the page so that write time is saved by skipping.

As another example, one or more of the methods of the present disclosure may be implemented in a controller of a memory device (e.g., by the mapping circuitry 150 and the interleaving circuitry 158 of FIG. 1, in which case the non-volatile memory 104 may operate as a conventional non-volatile memory without regard for (or knowledge of) the mapping and interleaving of data occurring at the controller 118).

Figure 9:
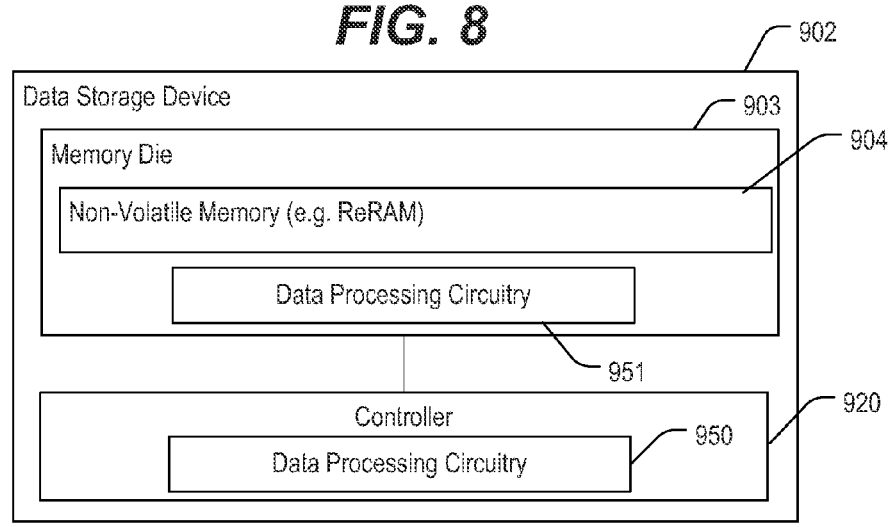
FIG. 9 is a block diagram of another particular embodiment of a data storage device configured to interleave mapped data to reduce average write time.

As another example, one or more of the methods of the present disclosure may be implemented by cooperation of a memory device and a memory controller. FIG. 9 illustrates an example of a data storage device 902 that includes a controller 920 coupled to a memory die 903. The controller 920 includes first data processing circuitry 950. The memory die 903 includes a non-volatile memory 904 (e.g., a ReRAM) and second data processing circuitry 951. The data processing circuitry 950 and 951 may be configured to cooperate to accomplish mapping and interleaving as described with respect to the mapping circuitry 150 and the interleaving circuitry 158 of FIG. 1. For example, the first data processing circuitry 950 may be configured to apply a mapping to generate the mapped data 171 of FIG. 1, and the second data processing circuitry 951 may be configured to interleave the mapped data 171 to generate the interleaved mapped data 172 of FIG. 1. As another example, the second data processing circuitry 951 may track and store cycle counts, and the first data processing circuitry 950 may determine mapped values based on the cycle counts received from the second data processing circuitry 951 and interleave the mapped values to generate the interleaved mapped data 172 of FIG. 1. Although the controller 920 is illustrated as distinct from the memory die 903, in other implementations the controller 920 and the non-volatile memory 904 may be on a common die.

Figure 10:
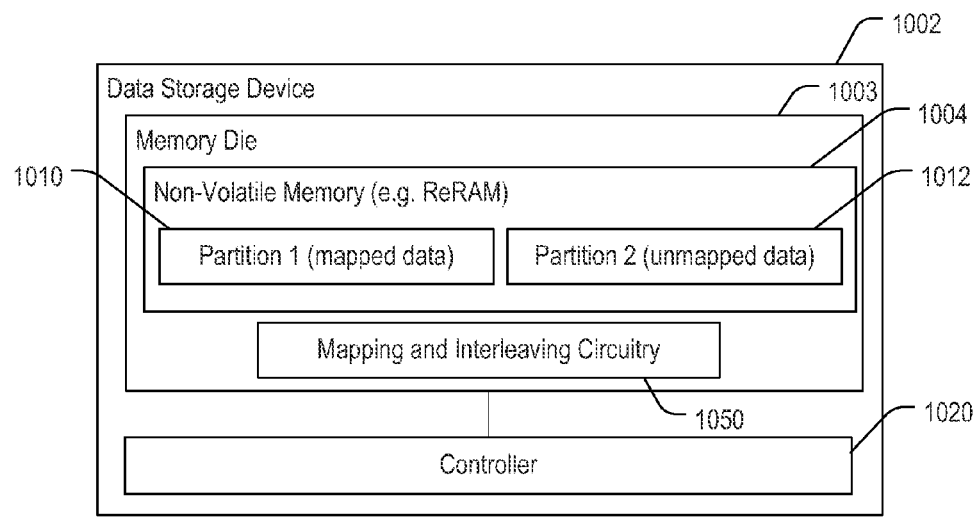
FIG. 10 is a block diagram of another particular embodiment of a data storage device configured to interleave mapped data to reduce average write time.

FIG. 10 illustrates an example of a data storage device 1002 that includes a controller 1020 coupled to a memory die 1003. The memory die 1003 includes a non-volatile memory 1004 (e.g., a ReRAM) and mapping and interleaving circuitry 1050. The non-volatile memory 1004 includes a first partition 1010 and a second partition 1012. The mapping and interleaving circuitry 1050 is configured to map and interleave received data for storage into the first partition 1010 and to not apply mapping and interleaving to data that is received for storage into the second partition 1012. The mapping and interleaving circuitry 1050 may be configured to operate in accordance with one or more of the methods of the present disclosure, such as by applying a mapping according to one or more of the coding schemes of FIGS. 4-7 and applying an interleaving scheme as described with respect to FIG. 2, as illustrative examples.

Although the controller 1020 is illustrated as distinct from the memory die 1003, in other implementations the controller 1020 and the non-volatile memory 1004 may be on a common die. Although the mapping and interleaving circuitry 1050 is on the memory die 1003, in other implementations the mapping and interleaving circuitry 1050 may be implemented on the controller 1020, such as illustrated with respect to FIG. 1, or partly on the controller 1020 and partly on the memory die 1003, such as illustrated with respect to FIG. 9.

Implementations where a mapping is based on the prior state of storage elements and based on the data to be stored may avoid storing metadata, such as a cycle count, but may have reduced write speed as compared to implementations where mapping of multiple groups of data bits is synchronized in each write operation. Implementations where a mapping is based on the new data and the cycle count, such as described with respect to the coding schemes of FIGS. 4-7, may track a cycle count that indicates a stage number of a cycle of write operations.

There are several possible implementations regarding the stage number in the cycle, including:

A. The mapping is based on the stage number in a cycle, and the stage number is retrieved from the memory together with the previous data bits without incurring a time penalty. For example, if a particular memory that is used requires RBW, a cycle count may be stored in the same page as the data bits and read as part of the RBW, incurring no additional time penalty to retrieve or to store the cycle count.

B. The mapping is based on the stage number in a cycle, and the stage number is not retrieved from the memory without incurring a time penalty. This is the case if no RBW is otherwise performed. Several options may be available in such implementations:

1. The stage number is read from the memory for each write command, incurring additional latency to read the stage number. In this case, only a few bits containing the stage number may be read rather than reading an entire page of data. In some memory types, reading a small amount of data is performed faster than reading a full page so the additional latency may be comparatively small.

2. The stage number is maintained by the controller (e.g., using the cycle counter 154 of FIG. 1). The controller may maintain a table of a current stage number for pages that are written using mapped data and may notify the memory device which stage number applies for each write command. As an example, the first data processing circuitry 950 of FIG. 9 may maintain stage numbers and may send the stage number and data to the second data processing circuitry 951 so that the second data processing circuitry 951 can select a next state based on the stage number. The stage number may be transferred to the memory as an additional parameter to a write command, as a prefix before a write command, the prefix identifying the stage number, or by using different operation codes (opcodes) for write commands at different stages of the cycle, as illustrative examples. As an alternative implementation, the controller may perform the mapping of the data values to states (and from states to data values during read operations) and may send the mapped data, such as the mapped data 171 of FIG. 1, to the memory using standard write commands. In this case, the memory may not be "aware" of the use of mapped data.

Some implementations of the disclosed systems and methods may introduce reduced device capacity while providing improved average write time. A memory device manufacturer may provide a device that is pre-configured to use one or more of the methods of the present disclosure. As another example, the manufacturer may provide a device that can be configured by the user to use one or more of the methods of the present disclosure to improve average write time. Alternatively, the manufacturer may provide a device in which a portion of the storage elements operates without using one or more of the methods of the present disclosure and another portion of the storage elements uses one or more of the methods of the present disclosure. For example, the device may be a multiple-partition device in which one partition provides improved write time, such as the first partition 1010 of FIG. 10, while other partitions may provide larger exported capacity, such as the second partition 1012 of FIG. 10. Alternatively, the user may be given the option to configure a partition to either use or not use one or more of the methods of the present disclosure, and optionally also to configure the partition size.

Alternatively, the user may be given the option to select, for each write command, whether or not the device should use one or more of the methods of the present disclosure (and may also specify whether to use the methods in each read operation if the memory is not configured to track which pages store interleaved mapped data). In such case, user software code executing in the host device connected to the storage device notifies the storage device whether mapping and interleaving should be performed for any write operation. The notification may be performed, for example, by using different opcodes for a write with mapping and interleaving and for a write without mapping and interleaving, by a Boolean flag parameter in the write commands indicating whether mapping and interleaving should be performed, or by implementing a global flag in the memory device that is set and reset by the host and indicates whether mapping and interleaving should be performed when performing a write operation (without having to indicate this separately for each write command).

Although FIG. 2 illustrates that each skip group is a continuous group of storage elements that are adjacent to each other (i.e., between any two storage elements that belong to the same skip group, there is no storage element that does not belong to that skip group), in other implementations one or more skip groups may not be continuous groups of storage elements, such as due to physical layout design considerations in the memory. The methods of the present disclosure are equally applicable to such implementations when an interleaving is applied that is configured to populate skip groups of storage elements with mapped data bits that have the same position in their corresponding mapping groups.

Various use cases illustrate examples where fast write operation is advantageous and a full memory page is available for each write operation even though the stored data is smaller than a page size.

A first example of such a use case is when a monitored performance measure of a memory is the number of random-address write operations of relatively large chunks of data (e.g., 4 KB chunks) that the memory can accept per second. This is a common measure for the responsiveness of solid state drive (SSD) devices and embedded memories in smartphones. If the page size of the memory is 8 KB then an input burst of data from the host can be stored into a fast cache partition that uses one or more of the methods of the present disclosure, such as with a K=1 and N=2 scheme that consumes a full page for each input data chunk of 4 KB. In such an implementation, the host sees a fast average write time and correspondingly measures a high number of input/output operations per second (IOPS).

A second example is when memory management firmware (e.g., a flash management module) managing the internals of a storage device handles its internal control tables. Such tables might be updated frequently, creating a performance burden. Such tables typically contain entries that are smaller than a page. If a table containing 512-byte entries is stored in a memory that uses 2 KB pages, one or more of the methods of the present disclosure may be used with memory blocks that contain the tables. For example, a K=1 and N=4 scheme may be used that consumes a full page for each table entry but achieves improved write time per entry.

Figure 11:
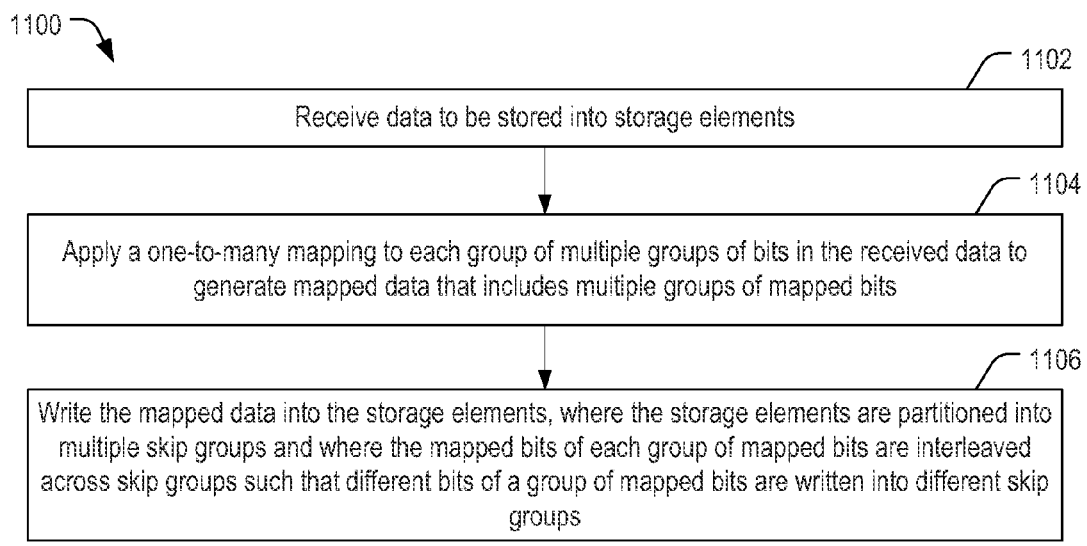
FIG. 11 is a flowchart of a particular embodiment of a method of interleaving mapped data to reduce average write time of a memory device.

FIG. 11 illustrates a particular embodiment of a method 1100 that may be performed in a memory device configured to write data to storage elements, such as in the data storage device 102 of FIG. 1. For example, the memory device may include a resistive random access memory (ReRAM). The memory device is configured to write data to the storage elements by performing at least one of a first operation on one or more first storage elements that are in a first state and a second operation on one or more second storage elements that are in a second state. The first operation changes the first state to the second state, such as a "set" operation, and the second operation changes the second state to the first state, such as a "reset" operation.

The method 1100 includes receiving data to be stored into the storage elements, at 1102. For example, the data may be the data 160 received at the mapping circuitry 150 of FIG. 1.

A one-to-many mapping is applied to each group of multiple groups of bits in the received data to generate mapped data, at 1104. The mapped data includes multiple groups of mapped bits. For example, the mapping 152 may be applied by the mapping circuitry 150 to generate the mapped data 171 of FIG. 1.

The mapped data is written into the storage elements, at 1106. The storage elements are partitioned into multiple skip groups, and the mapped bits of each group of mapped bits are interleaved across the skip groups such that different bits of a group of mapped bits are written into different skip groups. For example, the storage elements may be partitioned into the skip groups 120-122 of FIG. 1. Writing the mapped data into the storage elements may include, for at least one of the skip groups, determining whether the first operation is skipped. For example, the set operation may be skipped for skip groups corresponding to the first and second bit positions for stage 1 of the coding scheme of FIG. 4. Writing the mapped data into the storage elements may include, for at least one of the skip groups, determining whether the second operation is skipped. For example, the reset operation may be skipped for skip groups corresponding to the first, second, and fourth bit positions for stage 3 of the coding scheme of FIG. 5.

The mapping may be based on a cycle count of a cycle of write operations that are performed on the storage elements, such as the count 156 of FIG. 1. The mapping may be configured so that, for at least one stage of the cycle of write operations, at least one skip group does not require at least one of the first operation or the second operation, such as described with respect to the coding schemes of FIGS. 4-7.

The mapped bits of the groups of mapped bits may be interleaved so that a first skip group includes first mapped bits having a first bit position in each of the groups of mapped bits and a second skip group includes second mapped bits having a second bit position in each of the groups of mapped bits. For example, the first skip group 120 of FIG. 2 includes first mapped bits having the first bit position in each of the groups of mapped bits in the mapped data 171, and the second skip group 121 includes second mapped bits having the second bit position in each of the groups of mapped bits in the mapped data 171. The mapped bits of the groups of mapped bits may be interleaved so that no skip group includes multiple mapped bits from a single group of mapped bits. For example, the interleaving circuitry 158 of FIG. 1 may be configured to implement a full interleaving scheme, as described with respect to FIG. 2.

Skip groups may be arranged in the non-volatile memory 104 of FIG. 1 as continuous groups of storage elements or as non-continuous groups of storage elements. In a continuous skip group implementation, for each particular skip group, no storage element belonging to another of the skip groups is located between any two storage elements of the particular skip group. In a non-continuous skip group implementation, for at least one particular skip group, a storage element belonging to another of the skip groups is located between two storage elements of the particular skip group.

Although various components depicted herein are illustrated as block components and described in general terms, such components may include one or more microprocessors, state machines, or other circuits configured to enable the mapping and interleaving circuitry of FIGS. 1-2 and 7-9 to map received data values to mapped values. For example, the mapping circuitry and the interleaving circuitry may represent physical components, such as hardware controllers, state machines, logic circuits, or other structures, to enable the mapping circuitry to map received data values to mapped values.

The mapping circuitry, the interleaving circuitry, or a combination thereof, may be implemented using a microprocessor or microcontroller programmed to receive data values, identify a next state of storage elements, generate mapped values corresponding to the identified next state, and interleave the mapped values across multiple skip groups. In a particular embodiment, the mapping and interleaving circuitry includes a processor executing instructions that are stored at the non-volatile memory 104. Alternatively, or in addition, executable instructions that are executed by the processor may be stored at a separate memory location that is not part of the non-volatile memory 104, such as at a read-only memory (ROM).

In a particular embodiment, the data storage device 102 of FIG. 1 may be attached or embedded within one or more host devices, such as within a housing of a host device. For example, the data storage device 102 may be within a packaged apparatus such as a wireless telephone, a personal digital assistant (PDA), a gaming device or console, a portable navigation device, or other device that uses internal non-volatile memory. However, in other embodiments, the data storage device 102 may be implemented in a portable device configured to be selectively coupled to one or more external devices.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A device comprising:
a controller;
a memory device coupled to the controller and configured to write data to storage elements partitioned into multiple skip groups; and
mapping circuitry configured, in response to receiving data to be stored into the storage elements, to apply a one-to-many mapping to each group of multiple groups of bits in the received data to generate mapped data that includes multiple groups of mapped bits, wherein the mapped data differs from the received data, and wherein the mapped bits of each of the groups of mapped bits are interleaved across the skip groups such that different bits of at least one of the groups of mapped bits are written into different skip groups.

2. The device of claim 1, wherein the memory device includes a resistive random access memory (ReRAM).

3. The device of claim 1, wherein the memory device is configured perform an operation on one or more first storage elements of the storage elements, the one or more first storage elements in a first state, wherein the operation changes the first state to a second state, and wherein writing the mapped data into the storage elements includes, for at least one of the skip groups, determining whether to skip the operation.

4. The device of claim 1, wherein the storage elements include one or more first storage elements in a first state and one or more second storage elements in a second state, wherein the memory device is configured to perform at least one of a first operation on the one or more first storage elements and a second operation on the one or more second storage elements, wherein the first operation changes the first state to the second state, wherein the second operation changes the second state to the first state, and wherein writing the mapped data into the storage elements includes, for at least one of the skip groups, determining whether to skip the second operation.

5. The device of claim 1, wherein the mapping circuitry is configured to apply the mapping based on a cycle count of a cycle of write operations that are performed on the storage elements.

6. The device of claim 5, wherein the storage elements include one or more first storage elements in a first state and one or more second storage elements in a second state, wherein the memory device is configured to perform at least one of a first operation on the one or more first storage elements and a second operation on the one or more second storage elements, wherein the first operation changes the first state to the second state, wherein the second operation changes the second state to the first state, and wherein the mapping circuitry is configured to apply the mapping so that, for at least one stage of the cycle of write operations, at least one of the skip groups does not require at least one of the first operation or the second operation.

7. The device of claim 1, wherein the mapped bits of the groups of mapped bits are interleaved so that a first skip group includes only first mapped bits having a first bit position in each of the groups of mapped bits.

8. The device of claim 1, wherein the mapped bits of the groups of mapped bits are interleaved so that no two skip groups include mapped bits from a same bit position of the groups of mapped bits.

9. The device of claim 1, wherein, for each particular skip group, no storage element belonging to another of the skip groups is located between any two storage elements of the particular skip group.

10. The device of claim 1, wherein, for at least one particular skip group, a storage element belonging to another of the skip groups is located between two storage elements of the particular skip group.

11. A method comprising:
in a memory device configured to write data to storage elements, performing:
receiving data to be stored into the storage elements;
applying a one-to-many mapping to each group of multiple groups of bits in the received data to generate mapped data that includes multiple groups of mapped bits, wherein the mapped data differs from the received data; and
writing the mapped data into the storage elements, wherein the storage elements are partitioned into multiple skip groups, and wherein the mapped bits of each of the groups of mapped bits are interleaved across the skip groups such that different bits of at least one of the groups of mapped bits are written into different skip groups.

12. The method of claim 11, wherein the memory device includes a resistive random access memory (ReRAM).

13. The method of claim 11, wherein the memory device is configured to perform an operation on one or more first storage elements of the storage elements, the one or more first storage elements in a first state, wherein the operation changes the first state to a second state, and wherein writing the mapped data into the storage elements includes, for at least one of the skip groups, determining whether to skip the operation.

14. The method of claim 11, wherein the storage elements include one or more first storage elements in a first state and one or more second storage elements in a second state, wherein the memo device is configured to perform at least one of a first operation on the one or more first storage elements and a second operation on the one or more second storage elements, wherein the first operation changes the first state to the second state, wherein the second operation changes the second state to the first state, and wherein writing the mapped data into the storage elements includes, for at least one of the skip groups, determining whether to skip the second operation.

15. The method of claim 11, wherein the mapping is based on a cycle count of a cycle of write operations that are performed on the storage elements.

16. The method of claim 15, wherein the storage elements include one or more first storage elements in a first state and one or more second storage elements in a second state, wherein the memory device is configured to perform at least one of a first operation on the one or more first storage elements and a second operation on the one or more second storage elements, wherein the first operation changes the first state to the second state, wherein the second operation changes the second state to the first state, and wherein the mapping is configured so that, for at least one stage of the cycle of write operations, at least one skip group does not require at least one of the first operation or the second operation.

17. The method of claim 11, wherein the mapped bits of the groups of mapped bits are interleaved so that a first skip group includes only first mapped bits having a first bit position in each of the groups of mapped bits.

18. The method of claim 11, wherein the mapped bits of the groups of mapped bits are interleaved so that no two skip groups include mapped bits from a same bit position of the groups of mapped bits.

19. The method of claim 11, wherein, for each particular skip group, no storage element belonging to another of the skip groups is located between any two storage elements of the particular skip group.

20. The method of claim 11, wherein for at least one particular skip group, a storage element belonging to another of the skip groups is located between two storage elements of the particular skip group.

21. A data storage device comprising:
  a memory die that includes storage elements partitioned into multiple skip groups; and
  mapping circuitry configured to receive data to be stored into the storage elements and to generate mapped data based on applying a one-to-mapping to each group of multiple groups of bits in the received data, wherein the mapped data differs from the received data, wherein the mapped data includes multiple groups of mapped bits, and wherein the mapped bits of each of the groups of mapped bits are interleaved across the skip groups such that different bits of at least one of the groups of mapped bits are written into different skip groups.

22. The data storage device of claim 21, wherein the mapping circuitry is included on the memory die.

23. The data storage device of claim 21, further comprising a controller, wherein the controller includes a first portion of the mapping circuitry, and wherein a second portion of the mapping circuitry is included on the memory die.

* * * * *